US011920779B2

(12) United States Patent
Verlinden

(10) Patent No.: US 11,920,779 B2
(45) Date of Patent: Mar. 5, 2024

(54) ILLUMINATION DEVICE

(71) Applicant: HARMAN PROFESSIONAL DENMARK APS, Aarhus N (DK)

(72) Inventor: Wouter Verlinden, Keerbergen (BE)

(73) Assignee: Harman Professional Denmark APS, Aarhus (DK)

( * ) Notice: Subject to any disclaimer, the term of this patent is extended or adjusted under 35 U.S.C. 154(b) by 0 days.

(21) Appl. No.: 18/247,183

(22) PCT Filed: Sep. 30, 2020

(86) PCT No.: PCT/EP2020/077334
§ 371 (c)(1),
(2) Date: Mar. 29, 2023

(87) PCT Pub. No.: WO2022/069029
PCT Pub. Date: Apr. 7, 2022

(65) Prior Publication Data

US 2023/0366525 A1 Nov. 16, 2023

(51) Int. Cl.

| | |
|---|---|
| ***F21V 5/00*** | (2018.01) |
| ***F21V 5/04*** | (2006.01) |
| ***F21V 11/02*** | (2006.01) |
| ***F21V 21/005*** | (2006.01) |
| ***F21V 23/00*** | (2015.01) |

(Continued)

(52) U.S. Cl.
CPC .............. *F21V 5/007* (2013.01); *F21V 5/045* (2013.01); *F21V 11/02* (2013.01); *F21V 21/005* (2013.01); *F21V 23/006* (2013.01); *F21V 29/83* (2015.01); *F21V 31/005* (2013.01); *F21V 2200/40* (2015.01); *F21W 2131/406* (2013.01);
(Continued)

(58) Field of Classification Search
CPC .. F21Y 2103/10; F21Y 113/17; F21Y 103/10; F21Y 115/10; F21V 15/01; F21V 5/04; F21V 23/007; F21V 5/007; F21V 7/005
See application file for complete search history.

(56) References Cited

U.S. PATENT DOCUMENTS 8,596,820 B2 * 12/2013 Fukasawa ................. F21K 9/00
362/249.02
8,950,901 B2 * 2/2015 Moreau ..................... F21V 5/04
362/373

(Continued)

*Primary Examiner* — William J Carter
(74) *Attorney, Agent, or Firm* — Artegis Law Group, LLP

(57) ABSTRACT

The invention relates to an illumination device comprising a plurality of light cells arranged in a row, wherein each of the light cells comprises an illumination element configured to emit light, a rectangular front lens, and a light guide configured to guide the light emitted from the illumination element to the rectangular front lens, and to an illumination device comprising a housing in which the plurality of light cells are arranged, wherein each light cell is separated from a neighboring light cell in the row by a separator which separates an edge of the front lens from one of the plurality of light cells from the edge of the front lens of the neighboring front lens by a first width, wherein the plurality of light cells comprise outer light cells in where a side surface of housing abuts one of the edges of the corresponding front lens of the outer light cell, wherein the side surface abuting one of the edges of the front lens has a thickness which is half of the first width.

17 Claims, 11 Drawing Sheets

(51) Int. Cl.

| | |
|---|---|
| ***F21V 29/83*** | (2015.01) |
| ***F21V 31/00*** | (2006.01) |
| ***F21Y 103/10*** | (2016.01) |
| ***F21Y 113/17*** | (2016.01) |
| ***F21Y 115/10*** | (2016.01) |
| *F21W 131/406* | (2006.01) |

(52) U.S. Cl.
CPC ....... *F21Y 2103/10* (2016.08); *F21Y 2113/17* (2016.08); *F21Y 2115/10* (2016.08)

(56) References Cited

U.S. PATENT DOCUMENTS

| | | | | |
|---|---|---|---|---|
| 2004/0037077 | A1* | 2/2004 | Showers | G09F 13/04 362/235 |
| 2006/0279946 | A1* | 12/2006 | Park | G02F 1/133603 362/240 |
| 2009/0303712 | A1* | 12/2009 | Wung | F21V 19/003 362/234 |

* cited by examiner

ILLUMINATION DEVICE

CROSS-REFERENCE TO RELATED APPLICATIONS

This application is a national stage application of the international application titled "ILLUMINATION DEVICE," filed on Sep. 30. 2020, and having application number PCT/EP2020/077334. The subject matter of this related application is hereby incorporated herein by reference.

TECHNICAL FIELD

The present application relates to an illumination device and to a system comprising several illumination devices.

BACKGROUND

Illumination devices or light fixtures creating various light effects are commonly used in the entertainment industry in order to create various light effects in connection with live shows, television shows or sport events or as part of an architectural installation. Furthermore, these illumination devices are also used in relative simple light systems where only a few illumination devices are used such as in shops, private homes or companies.

For the different use cases the light fixtures or illumination devices can be combined into horizontal or vertical arrays of multiple illumination devices. However, in these devices an edge-to-edge illumination of the front surface is hardly possible when different illumination devices are combined to build a single illumination system.

Accordingly, a need exists to provide an illumination device and a system in which different illumination devices can be combined effectively while maintaining a homogeneous illumination of the system composed of the combination of illumination devices. It is especially preferable to have an edge-to-edge illumination which is more or less seamless and where it cannot be detected where one illumination device ends and where the other illumination device starts. This increases the flexibility of the light effects obtained and how many illumination devices are used to obtain a desired illumination.

SUMMARY

This need is met by the features of the independent claims. Further aspects are described in the dependent claims.

According to a first aspect an illumination device is provided comprising a plurality of light cells arranged in a row. Each of the light cells comprises an illumination element configured to emit light, a rectangular front lens, and a light guide configured to guide the light emitted from the illumination element to the rectangular front lens. The illumination device furthermore comprises a housing in which the plurality of light cells are arranged and each light cell is separated from a neighbouring light cell in the row by a separator which separates an edge of the front lens from one of the plurality of light cells from the edge of the front lens of the neighbouring front lens by a first width. The plurality of light cells furthermore comprises outer light cells where a side surface of the housing abutes one of the edges of the corresponding front lens of the outer light cell, wherein the side surface abutting one of the edges of the front lens has a thickness which is half of the first width.

With such an illumination device it is possible to combine different of the above-mentioned illumination devices. As the side surfaces of the housing have half of the width of the separation between the light cells within the illumination device, it is possible to combine two illumination devices side-by-side and at the same time the light cells of the different illumination devices arranged side-by-side have the same distance compared to the light cells arranged in the same housing. Accordingly, a system can be obtained without showing a visible gap or separation between adjacent illumination devices.

Furthermore, a system is provided comprising one illumination device as mentioned above or as discussed below as first illumination device and a second illumination device as mentioned above or as discussed below as second illumination device. The first and the second illumination devices are connected to one another by a fixing mechanism cooperating with fixing elements provided on each of the first and second illumination devices on a corresponding rear surface of the illumination devices. The illumination devices are arranged side-by-side and in the connected state two front lenses from different illumination devices are only separated by the two side surfaces of the corresponding housings and are separated by a distance corresponding to the distance between front lenses in the same illumination device, namely the first width.

Features mentioned above and features yet to be explained below may not only be used in isolation or in combination as explicitly indicated, but also in other combinations. Features and embodiments of the present application may be combined with each other unless explicitly mentioned otherwise.

DETAILED DESCRIPTION

Figure 1:
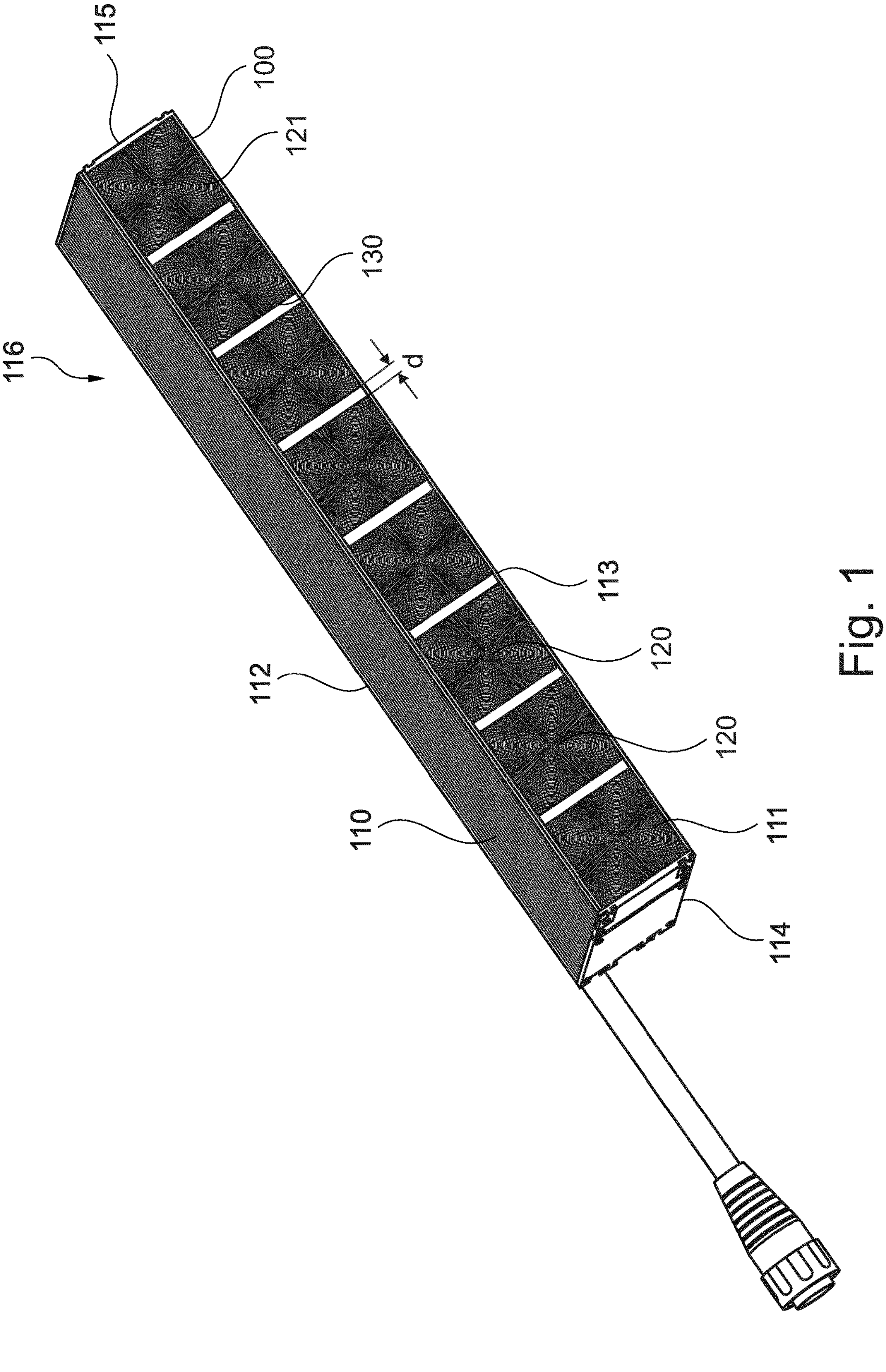
FIG. 1 shows a schematic perspective front view of an illumination device configured to be placed in connection with another illumination device in such a way that a seamless front surface is obtained where a gap or separation between adjacent illumination devices is not visible.

In the following, embodiments of the application will be described in more detail with reference to the accompanying drawings. It is to be understood that the following description of embodiments is not to be taken in a limiting sense. The scope is not intended to be limited by the embodiments described hereinafter or by the drawings which are to be taken demonstratively only. The drawings are to be regarded as being schematic representations and elements illustrated in the drawings are not necessarily shown to scale.

FIG. 1 shows a first example of an illumination device which provides an edge-to-edge illumination of the front surface with minimal gaps between the illuminated parts. Furthermore, the example shown is designed such that it can be combined with similar illumination devices such as the device shown in FIG. 1 or 2 wherein no visible gap or separation is seen between adjacent devices. The illumination device 100 comprises a housing 110 with a front surface 111 and four side surfaces 112 to 115. Furthermore a rear surface 116 is provided. The housing 110 is shaped as a rectangular block so that the side surfaces 112 and 113 are parallel to one another, in the same way the side surfaces 114 and 115 are parallel to one another, and the front surface 111 is parallel to the rear surface 116.

The illumination device 100 comprises several light cells 120 which are arranged in a row and each light cell comprises a rectangular or even square front lens 121. The different front lenses are separated by a separator 130. The separator 130 has a thickness or width d as shown in FIG. 1. The separator 130 is not transparent for light. This means that in the embodiment shown in FIG. 1 the illumination device 100 comprises eight different illuminated regions wherein each region is defined by the corresponding front lenses of the different light cells 120. The side surfaces 112 to 115 have a defined thickness or width which is exactly half of the width of the separator 130. In other words, the separator has a width which is exactly the double of the width of the outer side walls. This enables light fixtures or illumination devices as shown in FIG. 1 to be combined with a continuous pattern where no gaps are visible between adjacent illumination devices in the generated light pattern.

Figure 3:
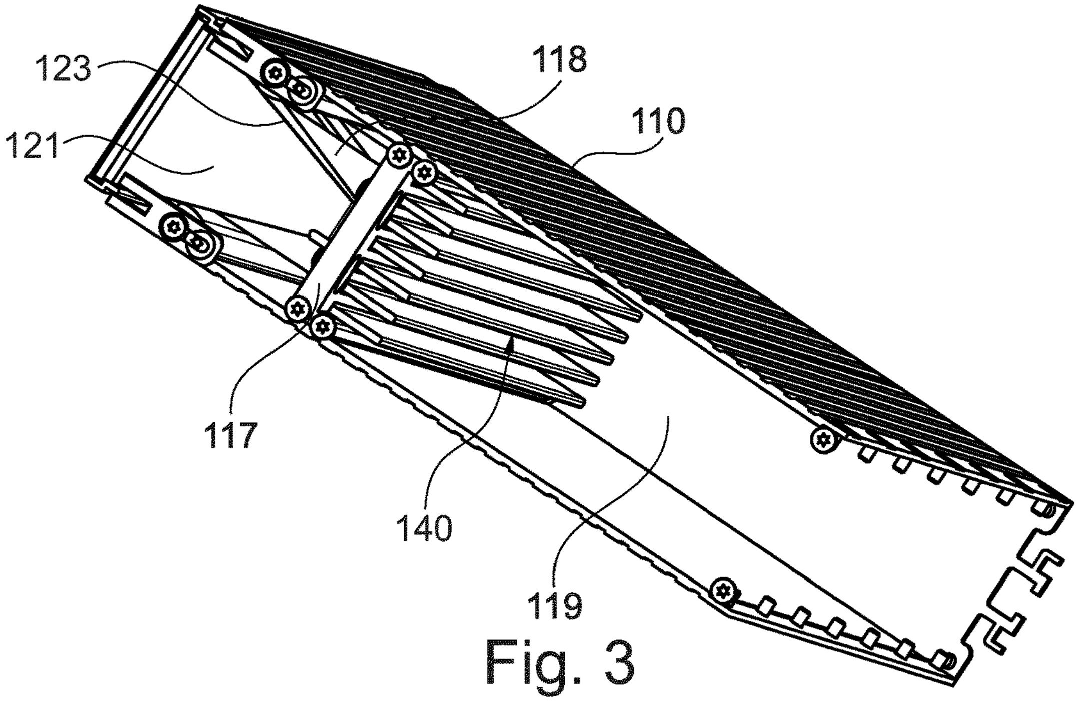
FIG. 3 shows a perspective view of the illumination device of FIG. 1 indicating some details of the interior of the illumination device.
Figure 4:
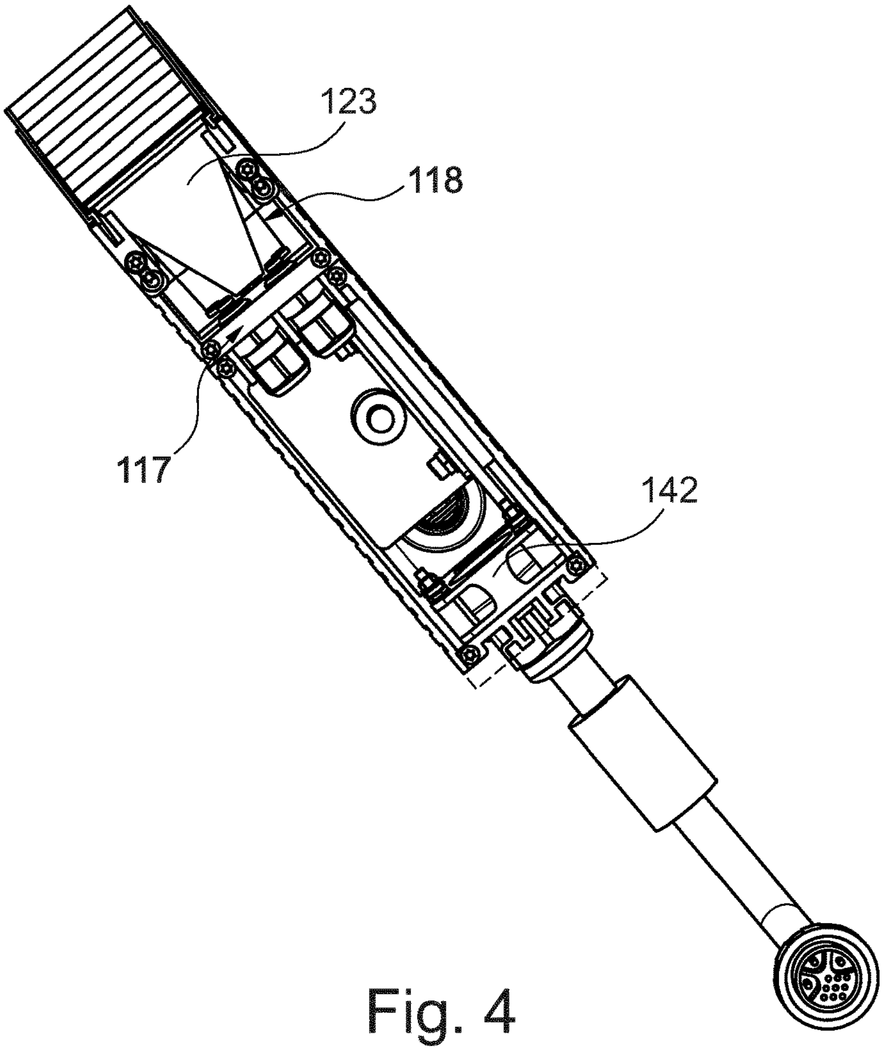
FIG. 4 shows a sectional side view of the illumination device of FIG. 1.

Making reference additionally to FIGS. 3, 4 and 7, the illumination device comprises the different light cells 120. Each light cell comprises at least one illumination element 122 shown in FIGS. 8 and 7 wherein LEDs are used in the embodiment shown. In the embodiment shown each light cell comprises 4 illumination elements 122*a* to 122*d*, wherein each of the illumination elements again comprises four LEDs or light sources of different colours such as a red LED, a green LED, a blue LED and a white LED. However it should be understood that also other colours might be used or that the LEDs have the same colour. As shown especially in FIG. 13 each of the illumination elements is a four colour light source. Accordingly each illumination element contains 4 light sources of the same colour, such as 4 red light sources (R), 4 green lights sources (G) and 4 blue light sources (B) and 4 white light sources (W). The illumination elements 122*a* to 122*d* are arranged relative to each other such that the light sources within one illumination element are rotated by 90 degrees relative to the neighbouring illumination element. Accordingly the arrangement is such that the light sources in illumination element 122*b* is rotated relative to the arrangement of the light sources in illumination element 122*a* by 90 degrees so that in case of 4 illumination devices 122*a* to 122*d*, none of the illumination devices 122*a* to 122*d* has the same arrangement of light sources relative to each other. Other rotation angles might be used. The illumination element could be any light source, including, but not limited to, incandescent lights, discharge lamps, LEDs, OLEDs (organic LEDs), PLEDs (polymer LEDs) or an combination thereof. Furthermore, a light guide 123 is provided which guides the light from the LEDs to a front lens 121. Each front lens may be implemented as a micro Fresnel lens, each Fresnel lens is square in shape and is located on the other end of the light guide which is shaped as a frustum. The fact that each illumination element has multiple light sources per colour results in a better colour mixing within a light guide and thus a more uniform colour mixing at the front lens.

As especially shown in FIGS. 3 and 4, the housing comprises a dividing wall 117 which divides the interior of the illumination device into a front compartment 118 and a rear compartment 119. The front compartment is sealed against water ingress and comprises the light cells with the illumination elements, the front lens, and the light guide. The rear compartment contains power supply and other modules needed to control the illumination device and is not water tight as it comprises cooling opening as discussed further below.

The heat generated in the front compartment by the different light cells is transferred to the rear compartment 119 using a cooling mechanism 140 which is implemented as a plurality of cooling fins provided at the dividing wall 117. The cooling fins can be an integral part of the dividing wall, however the dividing wall and the cooling fins might be separate components. FIG. 4 furthermore shows cooling fans 142 which are responsible for the air exchange from the interior of the housing to the exterior of the housing using cooling openings 145 and 146 shown in FIG. 11.

Figure 11:
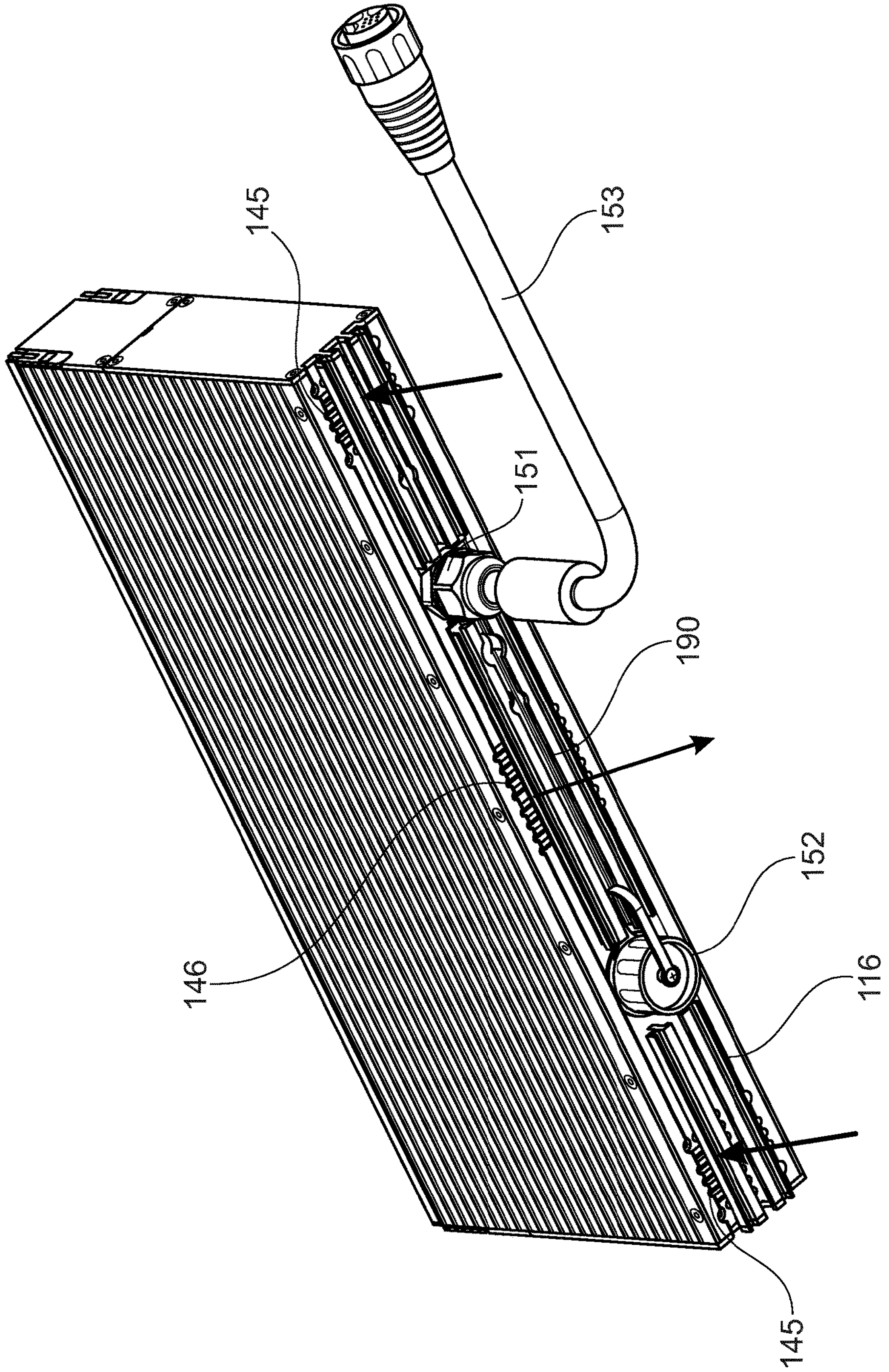
FIG. 11 shows a schematic perspective rear view of the illumination device of FIG. 1.

As shown in FIG. 11, the rear surface 116 comprises openings 145 which are configured to allow the circulation of cooling air in and out. The openings 145 may be provided as air inlets whereas opening 146 may be provided as air outlet. FIG. 11 shows furthermore a first interface 151 to which a connector 153 is connected which is provided for transmitting control data to the illumination device 100 and which is configured to provide the power supply to the electronic components provided within the housing. A second interface 152 is provided to output the data or power as received by interface 151 to another illumination device connected to the illumination device. As shown in FIG. 11, the interfaces 151, 152 or cooling openings 145, 146 are all provided on the rear surface and no cooling openings or connectors are provided on the side surfaces. This is mainly due to the fact that the illumination device may be connected to the same or a similar illumination device in a side-by-side arrangement so that the side surfaces are not accessible. Furthermore, the side surfaces should have the designed and specified thickness of half of the thickness of the separator so that no additional components are added to the side surfaces in order to maintain the option that two of the illumination devices 100 are arranged one on top of the other, while keeping the housings of the 2 interconnected illumination devices parallel to one another.

Figure 7A:
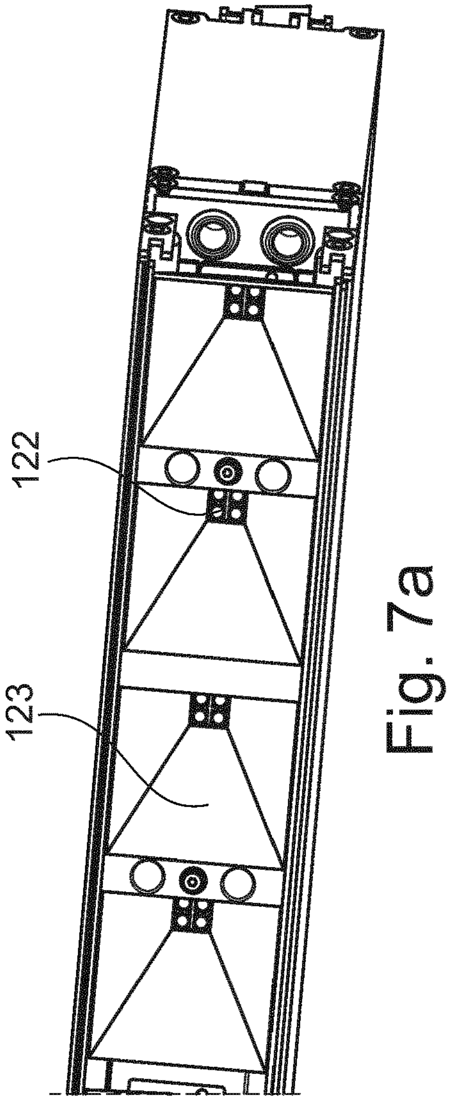
FIGS. 7*a* and 7*b* show partial views of the light cells contained in the illumination devices shown in FIGS. 1 to 6.
Figure 7B:
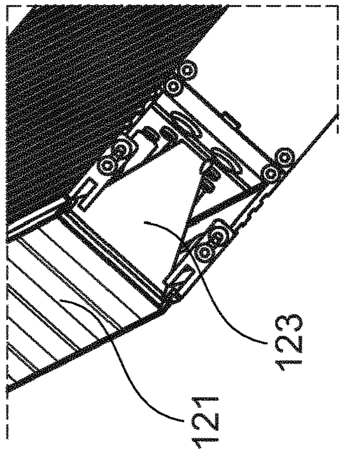
Figure 8:
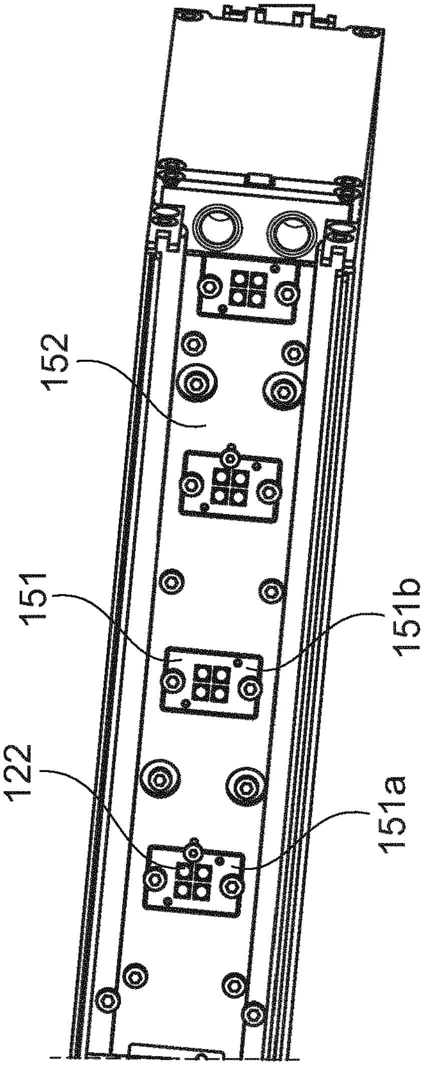
FIG. 8 shows a front view of a circuit boards used in the light cell shown in FIG. 7.
Figure 13:
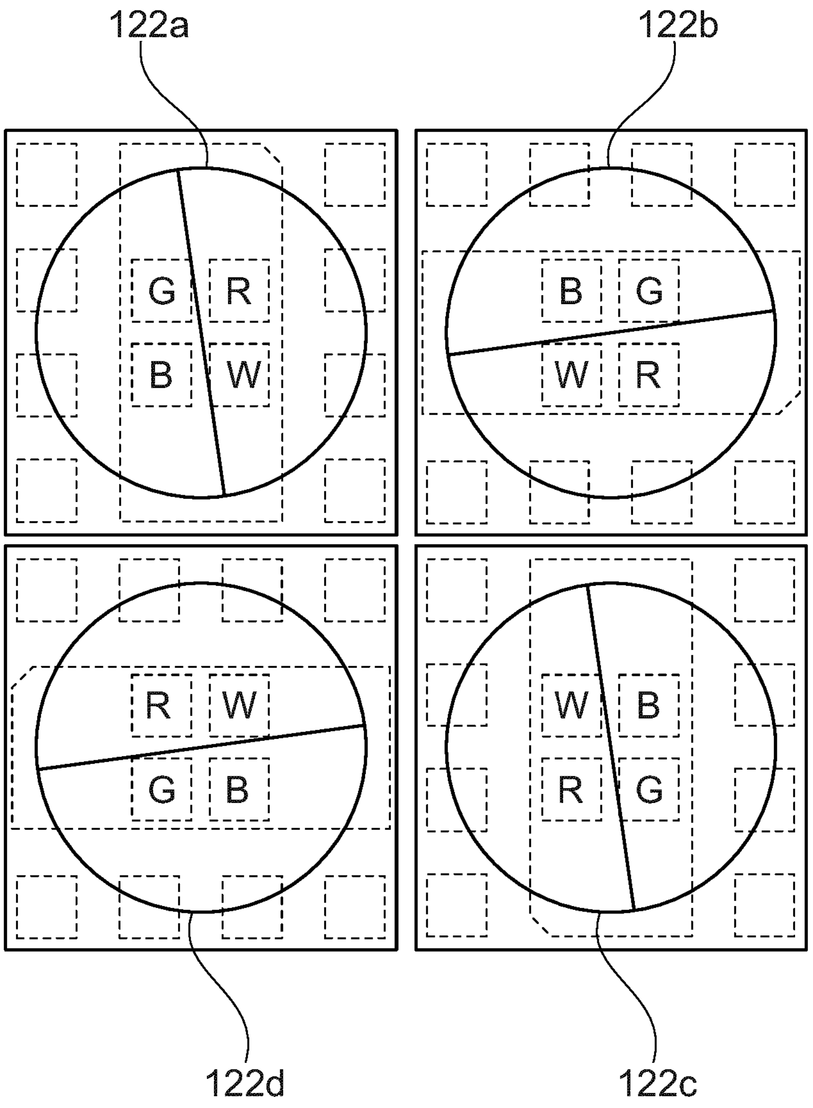
FIG. 13 shows a more detailed view of the illumination element used in each light cell.

FIGS. 7 and 8 show the light cells 120 in further detail. As shown in FIGS. 7A and 13, the light sources or LEDs as illumination element 122 are provided in a rectangular group of four illumination elements 122*a* to 122*d* with each of them having 4 light sources. The light of these light sources is mixed by the pyramid shaped light guide 123 or reflector before reaching the front lens 121 not shown in FIG. 7A but visible in FIG. 7B.

FIG. 8 shows a front view of a support structure for the light cells with the front lens and the light guide being removed. The four light sources that make up one cell are integrated into one small printed circuit board 151 which may be a metal core printed circuit board. Furthermore a second printed circuit board 152 is provided which is used for the transmission of the control electronics. This circuit board features the holes to position the small circuit board 151. The control electronics require less cooling compared to the light sources so the circuit board 152 may have a lower heat dissipation capacity compared to the circuit board 151. The colour and the brightness of each individual cell can be controlled separately in order to generate different effects such as video mapping effects. The circuit boards (PCBs) 151, 152 are mounted onto the separating wall and are thermally coupled to the separating wall so that heat from the PCBs can be transferred to the separating wall and then onward to the rear compartment 119.

The optical system described above provides perfectly mixed colours and even illuminated surfaces on the lenses so that an evenly lit front surface of the illumination device is obtained. The opening angle of the light guide defines the field of light that is transmitted by each of the light cells. The light guide 123 may be designed such that the total opening angle for the emitted light is between 20° to 30°, approximately around 25°, but other beam angles are possible.

Figure 9:
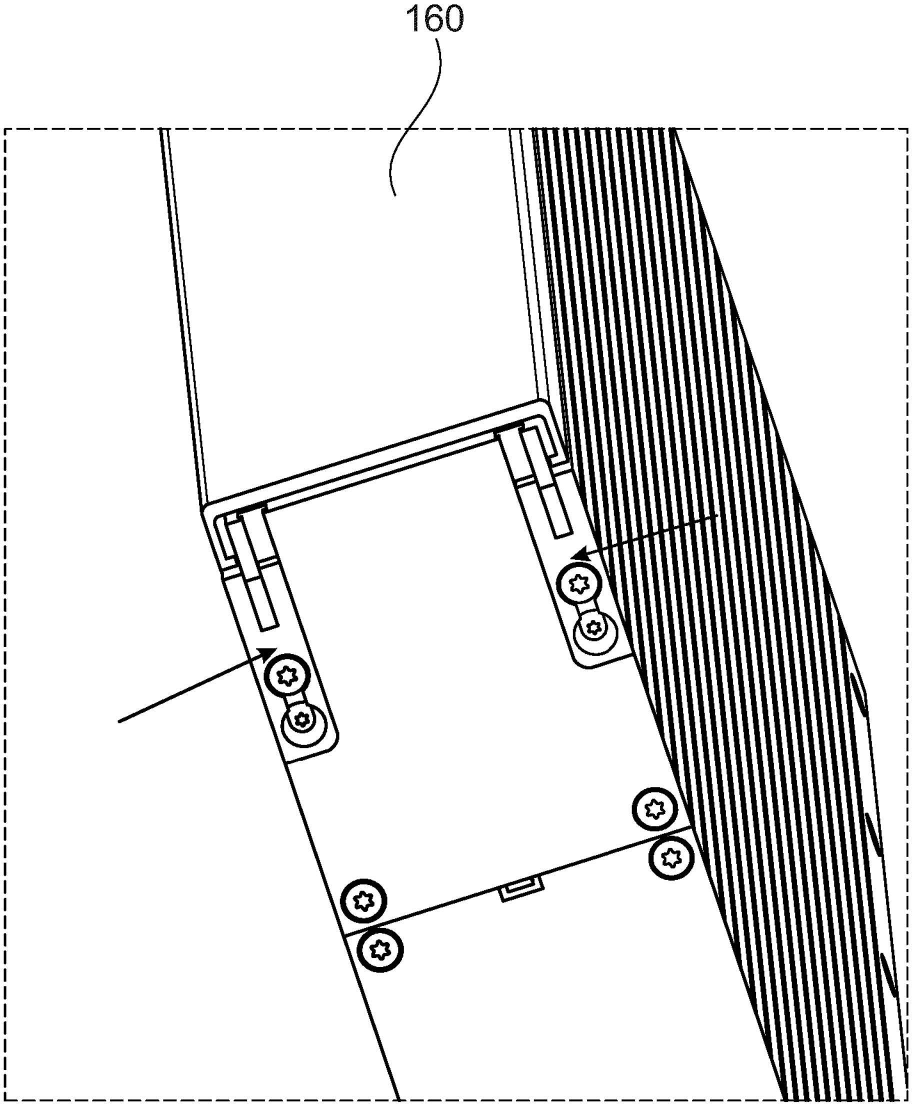
FIG. 9 shows a schematic perspective view of the illumination device of FIG. 1 to which an optional diffuser is attached.
Figure 10:
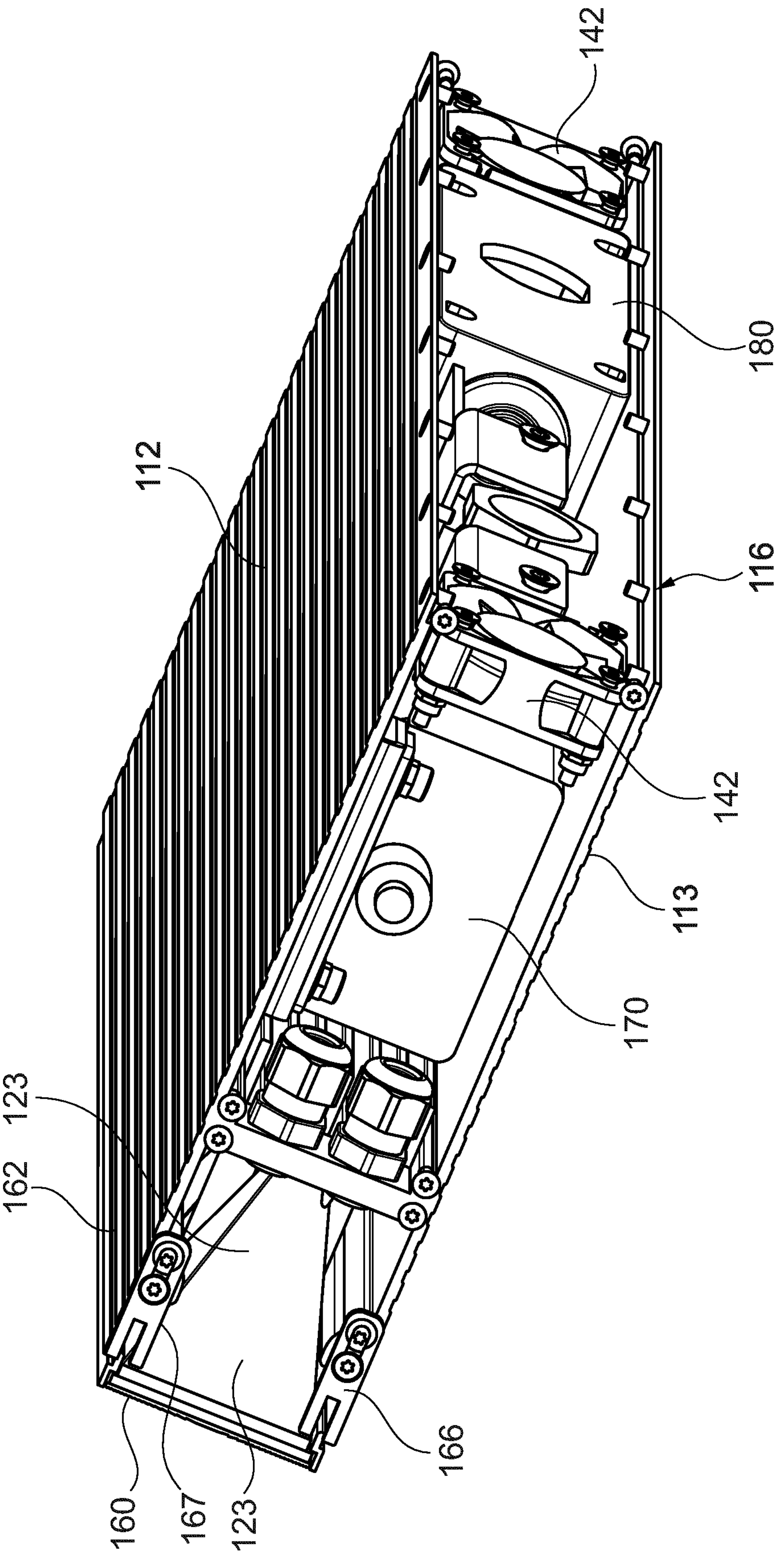
FIG. 10 shows another schematic perspective view of the illumination device of FIG. 1 in a partially cut-away view of the housing.

FIGS. 9 and 10 show in further detail how an additional optical diffuser can be attached to the illumination device. As shown in FIG. 10, after the light exits the front lens 121 the diffuser 160 is provided which additionally may open the opening angle of the emitted light. The diffuser is slided into the illumination device along the length as shown in FIG. 10 where the side surface 112 has recesses 162 which form a kind of rails into which the diffuser 160 can be slid in the direction of the row of light cells. Once the diffuser is installed two small fastening clips 166 and 167 provided in recessed parts of the side walls of the housing are slid up to lock the diffuser into its position. FIG. 10 furthermore shows as internal components the control unit 170 where the input signals are received and where the signals are processed, provided to the light sources and where the same signal may be transmitted to the interface for transmitting the received signals to another illumination device. Unit 170 is a (water proof) power supply unit which convers the incoming AC power to a lower voltage DC power as required by the light sources such as LEDs or the control electronics. Furthermore, a control box 180 (water proof) housing the main control electronics responsible for receiving control data from a control equipment (not shown) is provided which is responsible for providing control signals to the light sources or LEDs and the driving electronics in the front compartment.

Figure 2:
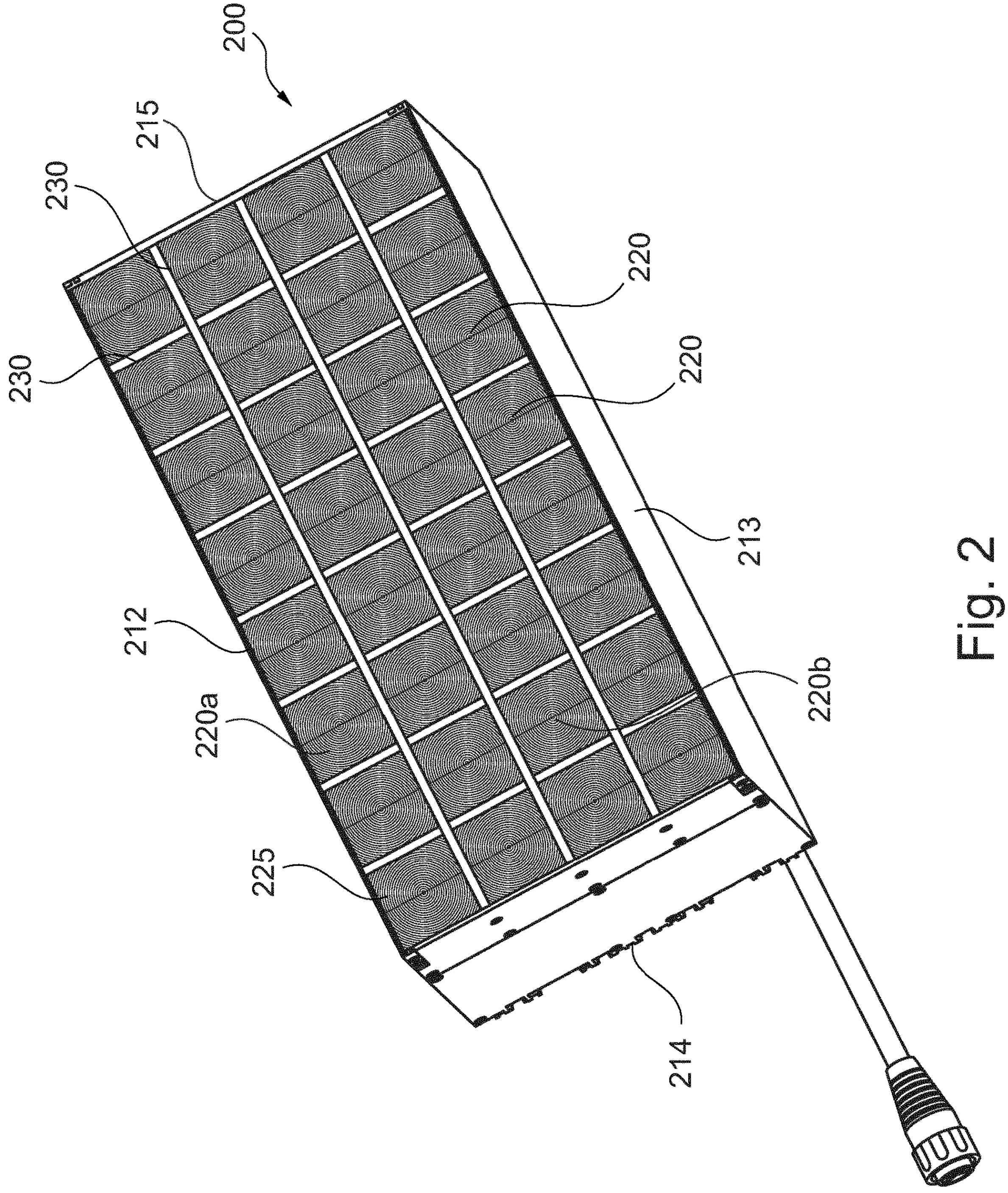
FIG. 2 shows a schematic perspective view of a further illumination device configured to be placed in connection with another illumination device in such a way that a seamless front surface is obtained and no gap or separation is visible between adjacent illumination devices.
Figure 6:
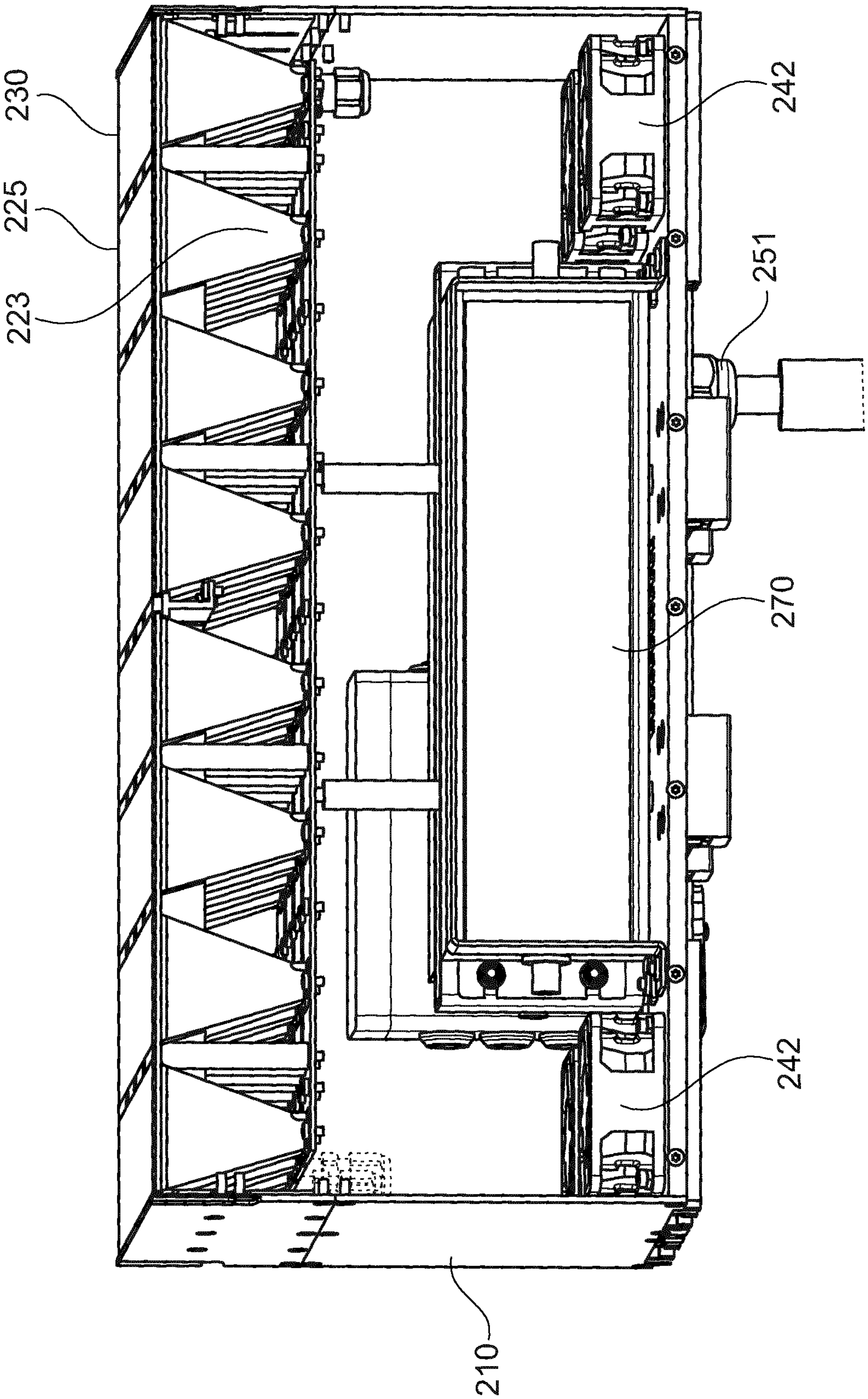
FIG. 6 shows another perspective view of the illumination device of FIG. 2 indicating further details of the interior of the housing.

FIG. 2 shows an illumination device 200 similar to the device 100. The illumination device 200 differs from the illumination device 100 by the fact that there is not a single row of light cells but in the embodiment shown four different rows of light cells. It should be understood that the device 200 could also have 2 or 3 rows or any other number of rows. Furthermore, the number of light cells provided in each row is not limited to 8 cells as shown for both device 100, 200, As in the embodiment of FIG. 1, each cell comprises illumination elements such as the elements shown in FIG. 7 or 8, a light guide 223 as shown in FIG. 6 and a front lens 225. Each of the front lenses is separated by a neighbouring front lens by a separator 230. As in the embodiment of a single row, the separator has a width which is twice the width of the thickness of the side surfaces 212 to 215. In the matrixlike arrangement of the front lenses each lens has the same distance to a direct neighbouring lens, independent of the fact whether the lenses are arranged in the same row or different rows or the same column or different columns. Similar to the embodiment for the single row illumination device 100, each row may have its own first and second printed circuit board on which the illumination devices of the corresponding row are provided. In the multi row example, the illumination device comprises internal cells such as cells 220*b*, which are only surrounded by other cells and thus only by separators 230. The illumination device 200 also comprises outer light cells 220*a* where at least one edge of the front lens abuts the housing. In the single row device 100 of FIG. 1 all light cells are outer cells. Accordingly, in an outer cell the housing is a boundary for at least of the edges of the front lens.

Figure 5:
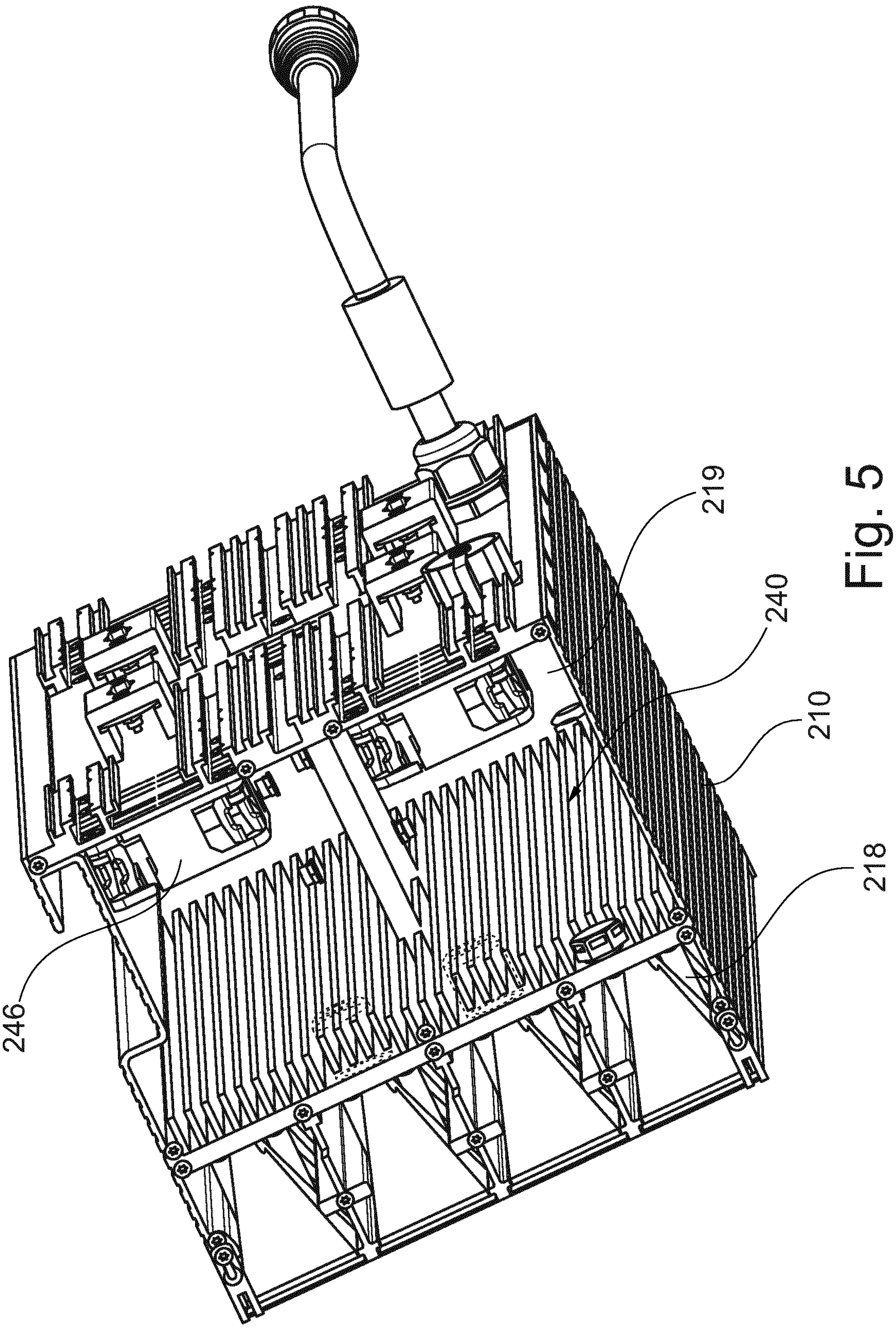
FIG. 5 shows a perspective view of the illumination device of FIG. 2 indicating details of the interior of the housing in which the illumination device is provided.
Figure 12:
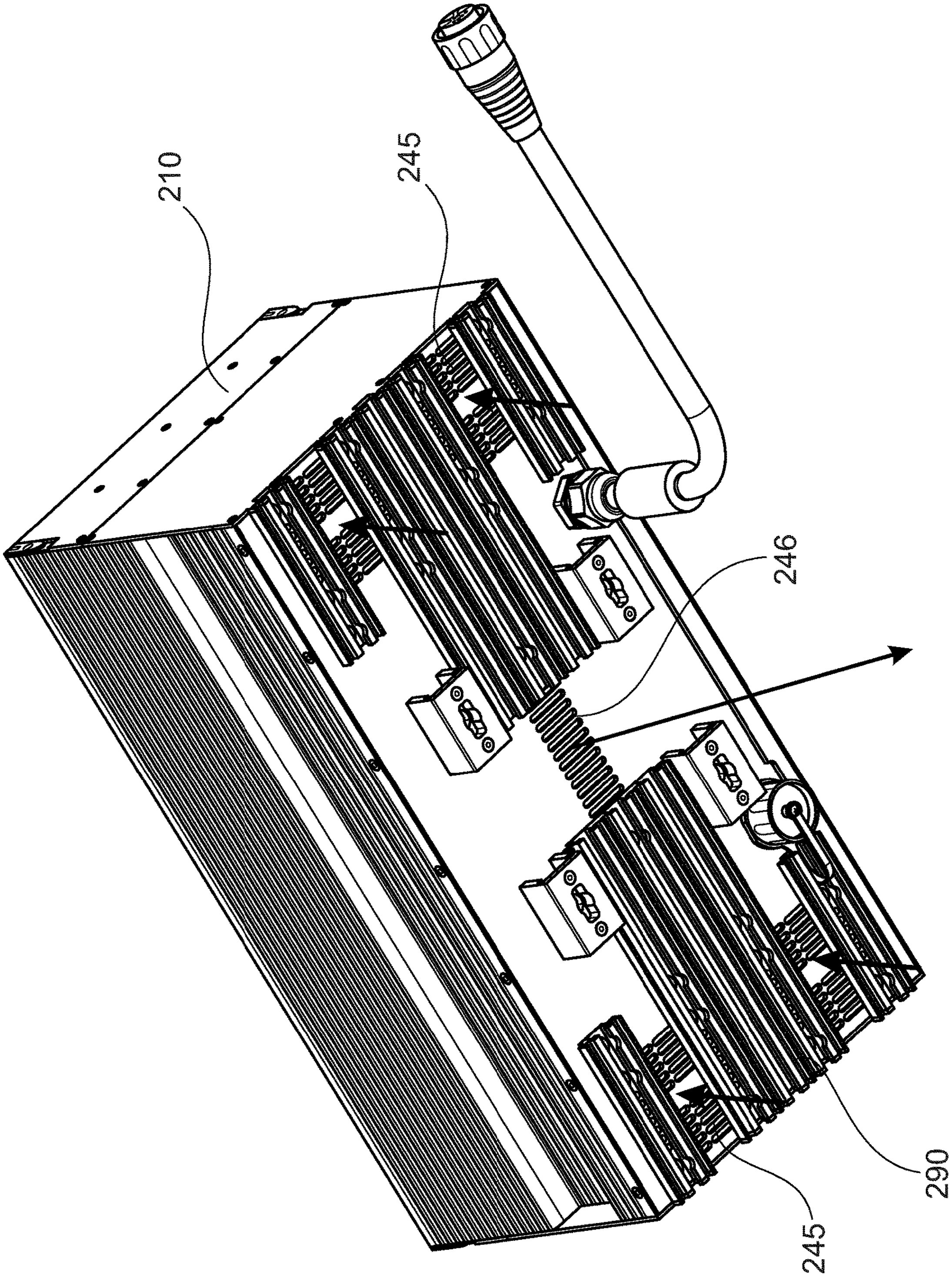
FIG. 12 shows a schematic perspective rear view of the illumination device of FIG. 2.

Making reference to FIGS. 5 and 12, a cooling mechanism 240 is shown which also distributes the heat generated in the front compartment 218 to the rear compartment 219. FIG. 12 shows the circulation of cooling air provided by the openings 245 on the rear surface of the housing 210 where the cooling air enters the housing. The cooling air leaves the housing at openings 246. The cooling fans 242 are also shown in FIGS. 5 and 6 which are responsible for the airflow through the interior. FIG. 6 furthermore shows the power supply unit 270 similar to unit 170 configured for receiving the input signal via interface 251 wherein a control box 280 processes the received signal and forwards the required instructions to the light sources in order to generate the desired light effect.

The illumination device 200 can be arranged side-by-side together with an illumination device 100 or with illumination device 200 so that in total LED illumination walls can be obtained with different number of columns and rows. Both illumination devices 100 and 200 have a wall thickness of the outer surfaces of d/2 as shown in FIG. 6 for device 200, however it is also true for housing 100.

As shown in FIGS. 5, 11 and 12, the rear sides of the corresponding illumination devices have fixing elements 190 with which each of the illumination devices can be connected to another illumination device or to any support structure which is configured to support the illumination device. In the embodiment shown the fixing elements are implemented as rails. In FIG. 11 rails are provided whereas in FIG. 12 several rails 290 are provided. Appropriate complementary fixing elements may be used to connect the illumination devices to other structures or to one another.

The illumination devices are configured such that they provide a light output per square meter of approximately more than 100,000 lumen per square meter, preferably even more than 150,000 or more than 160,000 lumen per square meter. In comparison, an LED video wall provides at maximum 25,000 lumen per square meter. Furthermore, it should be noted that the described illumination devices consume approximately more than 4000 W per square meter whereas in a normal video wall normally not more than 1000 W per square meter are consumed.

The two different illumination devices provide a solution in which a major amount of the front surface, by way of example more than 80% is illuminated with illuminating light and an edge-to-edge illumination of the front surface is obtained.

From the above said some general conclusions can be drawn:

As far as the illumination device is concerned, the illumination devices 100 and 200 comprise the different light cells 120 or 220. In the example of a single row such as shown in FIG. 1, each light cell is also an outer light cell where the side surface of the housing abuts an edge of a corresponding front lens. In the example shown in FIG. 2 the illumination device comprises outer cells 220*a* and inner cells 220*b*, the inner cells 220*b* are cells that only have other cells in the four boundaries whereas in an outer cell 220*a* at least one of the edges of the outer cell abuts the housing. In all the embodiments the housing especially the side surfaces have a thickness or width which is half of the width of the corresponding separators used between neighbouring light cells located in the same illumination device.

Preferably, in each of the outer cells 220*b*, 120 the front lens 121, 225 comprises at least one edge which is separated by the edge of the front lens of a neighbouring cell in the row by the separator 130,230, wherein all the side surfaces of the housing 110, 210 abutting one of the edges of the front lens located in an outer cell have a thickness which is half of the first width.

This makes sure that it is possible to combine different illumination devices and to add a new illumination device of the same or different type on one of the side surfaces whereas it is made sure that there is a seamless provision of light cells and the user cannot discriminate one illumination device from a neighbouring illumination device as there is a homogeneous distribution of the light cells.

Furthermore, each of the plurality of light cells 120, 220 is separated from a direct neighbouring light cell of the illumination device by the separator 130, 230 having the first width.

Furthermore, the housing 110, 210 comprises a front surface 111 where the front lenses 121 of the light cells are provided and the light from each light cell is directed in direction of the front surface. The housing additionally comprises a rear surface 116 opposite the front surface 111 and side surfaces 112 to 115 between the front at the rear surfaces.

It is possible to provide cooling openings 145, 146, 245, 246 configured for circulating cooling air between an internal space of the housing and a space outside the housing, wherein these cooling openings are provided only on the rear surface and not on the side surfaces or the front surface. As the side surfaces may be used for a side-by-side arrangement with another illumination device, it is preferred to have all the interfaces or connections or openings for the cooling on the rear surface. The front surface is reserved for outputting the light.

Furthermore, the illumination device may comprise a fixing element such as the elements 190 or 290 wherein the fixing element is only provided on the rear surface and not on the side surfaces or on the front surface.

Furthermore, interfaces such as interfaces 151 or 251 may be provided for providing power to each of the illumination elements and for providing control signals for controlling the light emitted by each of the light cells. This interface is also only provided on the rear surface and not on the side surfaces or on the front surface.

A defusing element may be provided which is configured to increase an opening angle of the light emitted by the illumination element through the rectangular front lens. The defusing element may be attached to the housing on the front surface wherein the housing itself comprises fixing recesses provided on the side surfaces configured to fix the defusing element on the front surface.

As discussed in connection with FIGS. 9 and 10, the diffusing element may be slid into the illumination device using the fixing recesses.

The housing may additionally comprise a dividing wall 117 configured to separate the housing into a front compartment 118, 218 and a rear compartment 119, 219 wherein the light cells are all arranged in the front compartment and wherein the dividing wall comprises cooling elements directed into the rear compartment and configured to dissipate heat generated by each of the light cells from the front compartment into the rear compartment. The rear compartment may furthermore comprise cooling openings configured for circulating cooling air between an internal space of the housing and a space outside the housing.

The front compartment may be sealed against water ingress.

Furthermore, it is possible that the light guide has the shape of a frustum.

Each of the light cells may comprise a plurality of illumination elements, each illumination element comprising light sources configured to emit light of different colors, wherein an arrangement of the light sources relative to each other differs from one illumination element to another illumination element within the same light cell. This helps to obtain a homogeneous illumination with a homogeneous colour. The light cells may be configured to provide more than 150,000 lumen per square meter. Furthermore, the illumination device may comprise, for each row of light cells a first printed circuit board comprising control electronics for controlling the illumination elements provided in the light cells of the corresponding row, wherein the first printed circuit board comprises a cut-out for each light cell where a second circuit board is provided on which the illumination element is located for each of the light cells. A heat dissipating capacity of the second circuit board is higher than the heat dissipating capacity of the first circuit board.

As far as the system of two different illumination devices are concerned two different illumination devices may be attached to another side-by-side even when the two illumination devices have a different number of rows or columns. By way of example, the illumination device shown in FIG. 1 may be combined with an illumination device as shown in FIG. 2.

The invention claimed is:

1. An illumination device comprising:

a plurality of light cells arranged in a row, wherein each of the light cells comprises:

an illumination element configured to emit light, a rectangular front lens, and a light guide configured to guide the light emitted from the illumination element to the rectangular front lens, and a housing in which the plurality of light cells are arranged, wherein each light cell is separated from a neighboring light cell in the row by a separator which separates an edge of the rectangular front lens from one of the plurality of light cells from the edge of the rectangular front lens of the neighboring light cell by a first width, wherein the plurality of light cells comprise outer light cells where a side surface of the housing abuts one of the edges of a corresponding rectangular front lens of the outer light cell, wherein the side surface abutting one of the edges of the rectangular front lens has a thickness which is half of the first width.

2. The illumination device according to claim 1, wherein in each of the outer light cells, the rectangular front lens comprises at least one edge which is separated by the edge of the rectangular front lens of the neighboring light cell in the row by the separator, wherein all the side surfaces of the housing abutting one of the edges of the rectangular front lens located in one of the outer light cells have a thickness which is half of the first width.

3. The illumination device according to claim 1, wherein each of the plurality of light cells is separated from a direct neighboring light cell of the illumination device by the separator having the first width.

4. The illumination device according to claim 1, wherein the housing comprises a front surface where the rectangular front lenses of the plurality of light cells are provided, and light from each light cell is directed in a direction of the front surface, wherein the housing comprises a rear surface opposite the front surface, and side surfaces between the front surface and the rear surface.

5. The illumination device according to claim 4, wherein cooling openings configured for circulating cooling air between an internal space of the housing and a space outside the housing are provided only on the rear surface and not on the side surfaces or the front surface.

6. The illumination device according to claim 4, wherein the illumination device further comprises at least one fixing element configured to fix the illumination device to at least one further illumination device, wherein the at least one fixing element is only provided on the rear surface and not on the side surfaces or front surface.

7. The illumination device according to claim 4, wherein the housing comprises at least one interface for providing power to each of the illumination elements and control signals for controlling the light emitted by each light cell, wherein the at least one interface is only provided on the rear surface and not on the side surfaces or front surface.

8. The illumination device according to claim 4, further comprising a diffusing element configured to increase an opening angle of the light emitted by the illumination element through the rectangular front lens and configured to be attached to the housing on the front surface, wherein the housing comprises fixing recesses provided on the side surfaces configured to fix the diffusing element on the front surface.

9. The illumination device according to claim 1, wherein the housing comprises a dividing wall configured to separate the housing into a front compartment and a rear compartment, wherein the plurality of light cells is arranged in the front compartment, wherein the dividing wall comprises cooling elements directed into the rear compartment and configured to dissipate heat generated by each of the light cells from the front compartment into the rear compartment, wherein the rear compartment comprises cooling openings configured for circulating cooling air between an internal space of the housing and a space outside the housing.

10. The illumination device according to claim 9, wherein the front compartment is configured to be sealed against water ingress.

11. The illumination device according to claim 1, wherein the light guide has a frusto-conical shape.

12. The illumination device according to claim 1, wherein each light cell comprises a plurality of illumination elements, each illumination element comprising light sources configured to emit light of different colors, wherein an arrangement of the light sources relative to each other differs from one illumination element to another illumination element within a same light cell.

13. The illumination device according to claim 1, wherein the illumination elements of the illumination device are configured to provide more than 150,000 lumen per square meter.

14. The illumination device according to claim 1, wherein the rectangular front lens is a square front lens.

15. The illumination device according to claim 1, further comprising, for each row of light cells, a first printed circuit board comprising control electronics for controlling the illumination elements provided in the light cells of a corresponding row, wherein the first printed circuit board comprises a cut out for each light cell where a second printed circuit board is provided on which the illumination element is located for each of the light cells, wherein a heat dissipation capacity of the second printed circuit board is higher than the heat dissipation capacity for the first printed circuit board.

16. A system comprising:

a first illumination device comprising:

a plurality of first light cells arranged in a first row. wherein each of the first light cells comprises:

a first illumination element configured to emit light, a first rectangular front lens, and a first light guide configured to guide the light emitted from the first illumination element to the first rectangular front lens, and a first housing in which the plurality of first light cells are arranged, wherein each first light cell is separated from a neighboring first light cell in the first row by a first separator which separates an edge of the first rectangular front lens from one of the plurality of first light cells from the edge of the first rectangular front lens of the neighboring first light cell by a first width, wherein the plurality of first light cells comprise outer first light cells where a first side surface of the first housing abuts one of the edges of a corresponding first rectangular front lens of the outer first light cell, wherein the first side surface abutting one of the edges of the first rectangular front lens has a thickness which is half of the first width; and a second illumination device comprising:

a plurality of second light cells arranged in a second row, wherein each of the second light cells comprises:

a second illumination element configured to emit lights, a second rectangular front lens, and a second light guide configured to guide the light emitted from the second illumination element to the second rectangular front lens, and a second housing in which the plurality of second light cells are arranged, wherein each second light cell is separated from a neighboring second light cell in the second row by a second separator which separates an edge of the second rectangular front lens from one of the plurality of second light cells from the edge of the second rectangular front lens of the neighboring second light cell by the first width. wherein the plurality of second light cells comprise outer second light cells where a second side surface of the second housing abuts one of the edges of a corresponding second rectangular front lens of the outer second light cell. wherein the second side surface abutting one of the edges of the second rectangular front lens has a thickness which is half of the first width, wherein the first and second illumination devices are connected to each other by a fixing mechanism cooperating with fixing elements provided on each of the first and second illumination devices on corresponding rear surfaces of the first and second illumination devices, wherein in a connected state a first rectangular front lens of the first illumination device and a second rectangular front lens of the second illumination device that are only separated by the first side surface of the first housing and the second side surface of the second housing are separated by a distance corresponding to the first width.

17. The system according to claim 16, wherein the first and second illumination devices have a different number of rows of light cells.

* * * * *